(12) United States Patent
Karako

(10) Patent No.: US 11,199,829 B2
(45) Date of Patent: Dec. 14, 2021

(54) REMOTE MONITORING OF INDUSTRIAL CONTROL SYSTEMS

(71) Applicant: NEC Corporation Of America, Herzlia (IL)

(72) Inventor: Moshe Karako, Kiryat-Ono (IL)

(73) Assignee: NEC Corporation Of America, Herzlia (IL)

( * ) Notice: Subject to any disclaimer, the term of this patent is extended or adjusted under 35 U.S.C. 154(b) by 0 days.

(21) Appl. No.: 16/819,100

(22) Filed: Mar. 15, 2020

(65) Prior Publication Data

US 2021/0286338 A1 Sep. 16, 2021

(51) Int. Cl.
*G05B 19/406* (2006.01)

(52) U.S. Cl.
CPC .. *G05B 19/406* (2013.01); *G05B 2219/31449* (2013.01)

(58) Field of Classification Search
CPC ............... G05B 19/406; G05B 2219/31449
USPC ............................................... 700/28
See application file for complete search history.

(56) References Cited

U.S. PATENT DOCUMENTS

| | | | |
|---|---|---|---|
| 10,249,069 B1* | 4/2019 | Kerzner | G08B 5/22 |
| 2007/0041588 A1* | 2/2007 | Lin | G11B 20/24 381/71.1 |
| 2008/0101683 A1* | 5/2008 | Zombo | G01N 25/72 382/141 |
| 2008/0258914 A1* | 10/2008 | Kondo | G08B 13/19697 340/552 |
| 2011/0057812 A1* | 3/2011 | Matsuda | H04Q 9/00 340/870.07 |
| 2013/0099929 A1* | 4/2013 | Ophardt | A47K 5/1217 340/573.1 |

\* cited by examiner

*Primary Examiner* — Jigneshkumar C Patel

(57) ABSTRACT

A method for automatic monitoring of industrial control systems, comprising: monitoring an environment by an electromagnetic sensor to measure a plurality of electromagnetic pulses emitted by at least one industrial control device during operation of the at least one industrial control device; calculating automatically at least one normal data pattern based on an analysis of the plurality of electromagnetic pulses; matching between at least one new electromagnetic pulse measured by the electromagnetic sensor and the at least one normal data pattern to automatically detect at least one abnormal data pattern; and sending automatically a security alert in response to the abnormal data pattern.

11 Claims, 3 Drawing Sheets

REMOTE MONITORING OF INDUSTRIAL CONTROL SYSTEMS

FIELD AND BACKGROUND OF THE INVENTION

The present invention, in some embodiments thereof, relates to industrial control devices and, more particularly, but not exclusively, to remote monitoring of industrial control devices to identify security threats.

Industrial control systems (ICSs), are where computer controlled systems interact with real-world processes by monitoring and controlling the analog and digital input and output from devices, such as pumps, valves, heaters, and the like. ICSs may include a plurality of industrial control devices such as programmable logic controllers (PLCs), supervisory control and data acquisition (SCADA) systems and the like.

Current security techniques for ICS include network level security using firewalls, internet packet diodes and high security level password protected gateways. These security techniques are designed to prevent unauthorized access through the internet.

SUMMARY OF THE INVENTION

According to an aspect of some embodiments of the present invention there is provided a method for remote monitoring of industrial control systems, comprising: monitoring an environment by an electromagnetic sensor to measure a plurality of electromagnetic pulses emitted by at least one industrial control device during operation of the at least one industrial control device; calculating automatically at least one normal data pattern based on an analysis of the plurality of electromagnetic pulses; matching between at least one new electromagnetic pulse measured by the electromagnetic sensor and the at least one normal data pattern to automatically detect at least one abnormal data pattern; and sending automatically a security alert in response to the abnormal data pattern.

Optionally, the method further comprises calibrating the electromagnetic sensor to detect electromagnetic pulses within a specific electromagnetic spectrum.

Optionally, the at least one normal data pattern is calculated using at least one of local outlier factor analysis, cluster analysis and k-nearest neighbor analysis.

Optionally, the monitoring is also done by additional sensors, and the calculating and the matching is done also based on measurements of the additional sensors.

More optionally, the additional sensors include at least one of an imaging sensor and a sound sensor.

According to some embodiments of the invention there is provided a computer readable medium comprising computer executable instructions adapted to perform the method.

According to an aspect of some embodiments of the present invention there is provided a computerized device for remote monitoring of industrial control systems, comprising: at least one computerized processing unit for executing processor instructions; an electromagnetic sensor which monitors an environment to measure a plurality of electromagnetic pulses emitted by at least one industrial control device during operation of the at least one industrial control device; a learning module which calculates automatically at least one normal data pattern based on an analysis of the plurality electromagnetic pulses, using the at least one computerized processing unit; an anomaly detection module which matches between at least one new electronic measurement values measured on one of the at least one computerized control device and the at least one normal data pattern to detect automatically at least one abnormal data pattern, using the at least one computerized processing unit; and a data interface for sending a security alert in response to the abnormal data pattern.

According to an aspect of some embodiments of the present invention there is provided a software program product for remote monitoring of industrial control systems, comprising: a non-transitory computer readable storage medium; first program instructions for monitoring an environment by an electromagnetic sensor to measure a plurality of electromagnetic pulses emitted by at least one industrial control device during operation of the at least one industrial control device; second program instructions for calculating automatically at least one normal data pattern based on an analysis of the plurality of electromagnetic pulses; third program instructions for matching between at least one new electromagnetic pulse measured by the electromagnetic sensor and the at least one normal data pattern to automatically detect at least one abnormal data pattern; and fourth program instructions for sending automatically a security alert in response to the abnormal data pattern; wherein the first, second, third, and fourth program instructions are executed by at least one computerized processor from the non-transitory computer readable storage medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
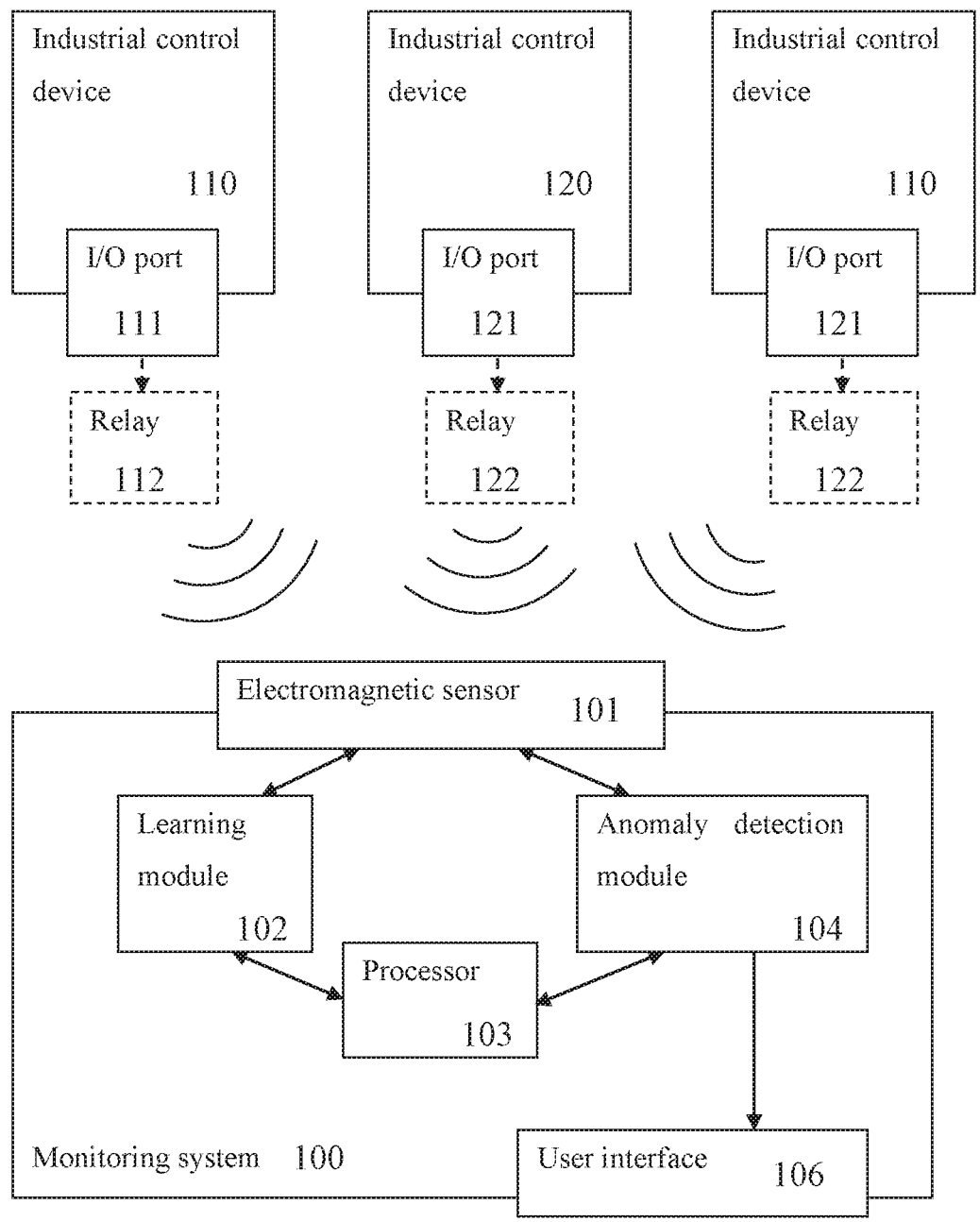
FIG. 1 is a schematic illustration of a system of remote monitoring of industrial control systems, according to some embodiments of the present invention.

The present invention, in some embodiments thereof, relates to industrial control devices and, more particularly, but not exclusively, to remote monitoring of industrial control devices to identify security threats.

ICSs have been incorrectly considered as inherently secure for a long time, and measures focused on the communication layers and gateways (such as disconnection from the internet) addressed potential unauthorized outside access. Only recently are the possibilities of attacks via local access within the industrial control network or direct access to the industrial control devices are being considered and new solutions are being searched.

Because the ICSs industry is slow to adopt new technologies or changes, and the cost of hardware changes is extremely high, solutions that require new hardware, modifications of existing hardware, or even authorization from hardware vendors may be slow and costly to implement.

According to some embodiments of the present invention, there is provided an un-intrusive and independent monitoring system to identify cyber-attacks on ICSs. The system utilizes the electromagnetic pulses emitted from industrial control devices during operation, and optionally from devices connected to these industrial control devices, and identifies changes in the pattern of these pulses. Input and output (I/O) ports of an industrial control devices, and some devices connected to the I/O ports, such as relays, may create strong electromagnetic pulses when operated, that may be easily detected. An electromagnetic pulse may be created, for example, when an industrial control device gives a command via an I/O port to a high voltage relay, or operates switching of a pump.

An electromagnetic sensor monitors the environment to measure the electromagnetic pulses emitted by one or more industrial control devices. A learning module of the monitoring system receives the measured electromagnetic pulses and uses them as training data to calculate normal pattern of electromagnetic pulses during normal operation of the industrial control devices. An anomaly detection module of the monitoring system receives new measured electromagnetic pulses and compares them to the normal pattern, to automatically detect patterns anomalies. When an abnormal pattern is detected, a security alert may be sent automatically, for example using a user interface of the monitoring system.

Since no part of the remote monitoring system is connected (or even in very close proximity) to the ICS, it has the advantage that no authorization is needed from the manufacturer(s) of the industrial control devices, and using the monitoring system cannot be considered as violation of warranty or be pointed out as a cause for any malfunction in the system. Also, no proprietary knowledge of internal protocols of the hardware manufacturers and/or software implementation is needed for installation and/or integration the monitoring system.

Another advantage is that remote monitoring system can operate in a network that is completely isolated from the ICS network, so it is not exposed by itself to a potential cyber attack on the ICS network. Also, data collected by the remote monitoring system reflects the true state of the physical devices attached to the industrial control devices and not dependent on an attack violation of the ICS.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
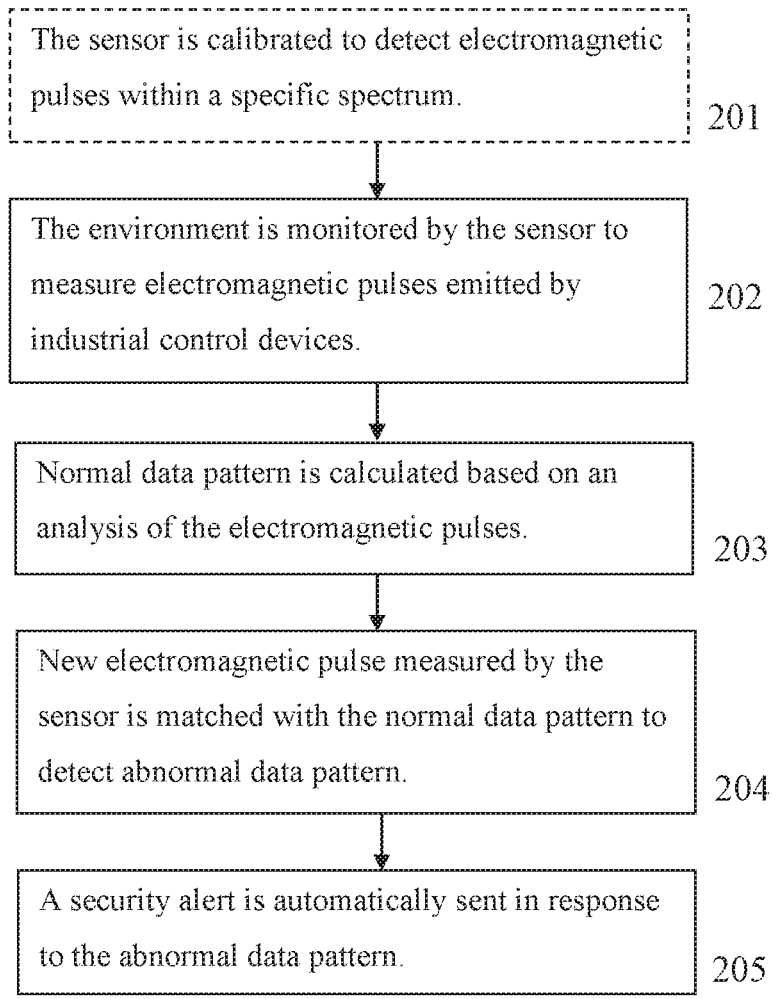
FIG. 2 is a flowchart schematically representing a method for remote monitoring of industrial control systems, according to some embodiments of the present invention.

Referring now to the drawings, FIG. 1 is a schematic illustration of a system of remote monitoring of industrial control systems, according to some embodiments of the present invention. Reference is also made to FIG. 2, which is a flowchart schematically representing a method for remote monitoring of industrial control systems, according to some embodiments of the present invention.

Industrial control devices 110, 120 and 130 may include any type of control device, system and/or associated instrumentation used for industrial process control. This may include, for example, programmable logic controllers (PLCs), supervisory control and data acquisition (SCADA) systems, individual remote terminal units (RTUs), distributed control systems (DCS), and/or combination thereof.

Each of I/O ports 111, 121 and 131 of industrial control devices 110, 120 and 130, respectively, may be a discrete port or an analog port. These ports read and write discrete or analog electrical signals, and may be used to connect the industrial control device to sensors and actuators. Discrete signals behave as binary switches with only two states, yielding an On or Off signal (1 or 0, True or False, respectively), and are sent using either voltage or current, where a specific range is designated as On and another as Off. Analog signals have a range of values between zero and full-scale, and may be interpreted as integer values (counts) by the industrial control device, with various ranges of accuracy.

Relays 112, 122 and 132 may be connected to I/O ports 111, 121 and 131, respectively. Relays 112, 122 and 132 may be any type of electrically operated switch.

Monitoring system 100 may include one or more computing devices such as computer, laptop, server, mobile device, a mainframe computer, an enterprise server, a workstation, multiple connected computers and/or one or more virtual machines. Monitoring system 100 includes electromagnetic sensor 101, learning module 102, processor 103 and anomaly detection module 104.

Electromagnetic sensor 101 may include, for example an antenna electrically connected to the receiver. The antenna may use any sensing method, such as passive, active, directional, omni, surface, current loops and/or any other method.

Optionally, monitoring system 100 also includes additional sensors to collect other data related to the operation of the ICS. For example, monitoring system 100 may include an imaging sensor, such as a light sensor, a motion detector, a camera, and/or any other light detector. For example, monitoring system 100 may include a sound sensor, such as a microphone or a vibration sensor. These sensors may monitor, for example, light and/or sound emitted by the industrial control devices during operation. For example, a relay or a capacitor may make a click sound when switched on or off, light-emitting diode (LED) indicators may be switched on and off, noise and vibrations may be caused by the controlled process itself such as motors running, alarm buzzers and/or other devices. An imaging sensor may also detect control panel readouts such as gauge meters, indicators, switches position and the like.

Processor 103 may execute software that includes instructions for performing the method. Processor 103 may include one or more processors arranged for parallel processing, as clusters and/or as one or more multi core processor(s).

Figure 3:
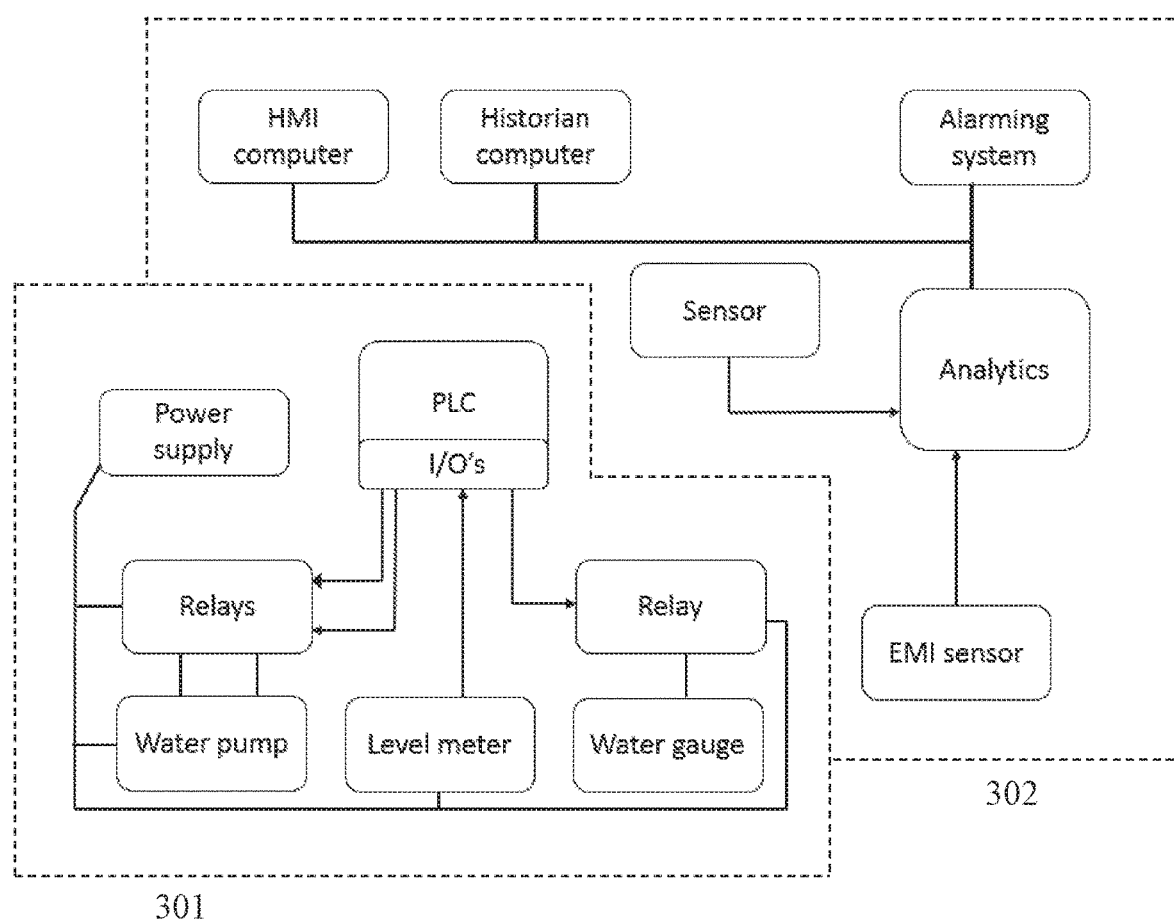
FIG. 3 is a schematic diagram of an exemplary ICS system and a monitoring system, according to some embodiments of the present invention.

Reference is now made to FIG. 3, which is a schematic diagram of an exemplary ICS system and a monitoring system, according to some embodiments of the present invention. The ICS system 301 includes a PLC with I/O ports, connected to several relays which are controlling devices such as water pump, level meter and water gauge. The monitoring system 302 includes sensors, analytics computer which includes a processor, a learning module and an anomaly detection module; and interfaces such as alarming system and human machine interface (HMI). Also included is a historian computer which is logging the all the telemetry received from the PLCs, commands sent and log messages received in the system.

First, optionally, as shown at 201, electromagnetic sensor 101 is calibrated to detect electromagnetic pulses within a specific electromagnetic spectrum (range of frequencies). The specific spectrum is selected so that the electromagnetic pulses emitted from industrial control devices are detected, but no other environmental disturbances are detected. For example, in low frequencies such as 10 hertz, electromagnetic noise such as power supply or room lighting are detectable and may disturb the detection of the electromagnetic pulses emitted from industrial control devices. Relevant spectrum may range, for example, between 10 hertz and 10 kilohertz. The calibration may be done for each industrial control device, I/O port and/or relay, or for the ICS as a whole. The calibration may be done, for example, by switching a relay on and off several times while sampling the electromagnetic field in all frequencies, for example by a software defined radio. Optionally, calibration may be done during "quiet times" such as nights or maintenance downtimes to actively generate calibration signals.

Optionally, the system includes predefined calibrated electromagnetic spectrum(s) that is suitable for known device, I/O port and/or relay.

Then, as shown at 202, the environment is monitored by electromagnetic sensor 101 to measure a plurality of electromagnetic pulses emitted by at least one industrial control device, I/O port and/or relay during operation. Optionally, electromagnetic pulses emitted by controlled devices, such as motors, valves, and/or switches, are also monitored.

Some electromagnetic pulses are more disguisable than others, for example high-current switching signals, signals from certain types of relays that are based on magnetic inductor technology, and/or internal switching signals from most types of PLCs. The strength of the electromagnetic pulses emitted varies by the type of the controlling device. For example, a three-phase high-current relay might have higher electromagnetic impact than a low power DC relay. For another example, an AC motor creates more electromagnetic impact than a DC motor. For another example, a water gauge creates higher electromagnetic impact than a signaling lamp.

Some industrial control devices create parasitic electromagnetic signals that are easy to detect. For example, a DC motor amplifies the parasitic electro-magnetic noise from the power supply that is feeding it. For another example, an AC motor has a speed controller which creates a unique electromagnetic pulse from its internal switching circuitry.

Optionally, electromagnetic pulses emitted by more than one device, I/O port and/or relay are monitored, and a directional electromagnetic sensor is used to separate the electromagnetic pulses of each source. Optionally, parameters such as timing, coexistence signals, multiple sensors reads and/or level of signal, are used to create a "map" of the signals.

Then, as shown at 203, at least one normal data pattern is automatically calculated by learning module 102, based on an analysis of the plurality of electromagnetic pulses. Learning module 102 may use processor 103 to analyze the electromagnetic pulses, for example as training data for machine learning algorithms.

Analysis may be performed using semi-supervised machine learning. Some of the pattern recognition methods to detect anomalies in the data may include k-nearest neighbors (k-NN), local outlier factor (LOF), cluster analysis, and the like. Optionally, analysis may take into account the temporal dimension of the data. For example, the rate of change of the pulse is detected as being abnormal. Optionally, pattern analysis takes into account the spatial information between the industrial control devices, and/or the data combined across industrial control devices working in a group. For example, two relays that control interdependent devices and their pulses are usually synced suddenly lose synchronization.

For example, for a relay that emits an electromagnetic pulse when it activates a pump, a normal data pattern may be, for example, a pulse at least once every hour, never more than 20 pulses an hour and never more than one minute apart.

Optionally, data from the additional sensors, such as light and sound, is also analyzed and included in the normal data pattern.

Then, as shown at 204, anomaly detection module 104 matches between at least one new electromagnetic pulse measured by the electromagnetic sensor, and the normal data pattern, to automatically detect at least one abnormal data pattern. The anomaly detection method may comprise a set of tools and machine learning algorithms which result in a dynamic and self-adapting monitoring system. The analysis may be based on data values and temporal sequencing. For the example above, when the relay starts emitting a pulse every few seconds, it may be an indication of an attack aimed to destroy the relay of the pump that the relay is operating. The abnormal data pattern may also be based, for example, on a threshold value, so an abnormal data pattern is detected when a pulse is stronger than a value during normal operation.

Then, as shown at 205, a security alert is automatically sent in response to the abnormal data pattern. The security alert may be sent, for example, to operators and/or supervisors of the ICS, for example by using user interface 106. A warning, alert and/or alarm may be activated for the facility personnel responsible for taking action to confirm and/or correct the operation of the facility and return the control system to normal operation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant ICSs will be developed and the scope of the term ICS is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for remote monitoring of industrial control systems, comprising:
    monitoring an environment of at least one industrial control device controlling an industrial process, by an electromagnetic sensor and at least one additional sensor selected from a group consisting of a light sensor and a sound sensor, said electromagnetic sensor is configured to measure a plurality of electromagnetic pulses emitted by the at least one industrial control device during operation of the at least one industrial control device, said light sensor is configured to detect light emitted by said at least one industrial control device during operation of the at least one industrial control device and said sound sensor is configured to detect sound emitted by said at least one industrial control device during operation of the at least one industrial control device,
    wherein said electromagnetic sensor and said at least one additional sensor are disposed externally and distant to said at least one industrial control device, for remote sensing of said at least one industrial control device, and not connected to said at least one industrial control device;
    calculating automatically at least one normal data pattern based on an analysis of the plurality of electromagnetic pulses and a plurality of sensed signals detected by the at least one additional sensor;
    matching between at least one new electromagnetic pulse measured by the electromagnetic sensor and new at least one of light signals and/or sound signals measured by the at least one additional sensor, and the at least one normal data pattern to automatically detect at least one abnormal data pattern; and
    sending automatically a security alert in response to the abnormal data pattern;
    wherein said at least one industrial control device is a member of a group consisting of: programmable logic controllers (PLCs), supervisory control and data acquisition (SCADA) systems, individual remote terminal units (RTUs), distributed control systems (DCS), and/or combination thereof.

2. The method of claim 1, further comprising calibrating the electromagnetic sensor to detect electromagnetic pulses within a specific electromagnetic spectrum.

3. The method of claim 2, wherein said specific electromagnetic spectrum is selected to discern said plurality of electromagnetic pulses emitted by the at least one industrial control device from electromagnetic pulses not generated by said at least one industrial control device.

4. The method of claim 1, wherein the at least one normal data pattern is calculated using at least one of local outlier factor analysis, cluster analysis and k-nearest neighbor analysis.

5. The method of claim 1, wherein the monitoring is also done by additional sensors, and the calculating and the matching is done also based on measurements of the additional sensors.

6. The method of claim 5, wherein the additional sensors include at least one of an imaging sensor and a motion sensor.

7. The method of claim 6, wherein said imaging sensor is configured to detect at least one control panel readout of said at least one industrial control device, wherein said at least one control panel readout is a member of a group consisting of gauge meters, indicators and switches position.

8. A non-transitory computer readable storage medium comprising computer executable instructions adapted to perform the method of claim 1.

9. The method of claim 1, wherein said sound sensor is configured to detect sounds generated by at least one member of a group consisting of switching sound of relays or capacitors, vibration sounds generated by running motors and sounds of alarm buzzers.

10. A computerized device for remote monitoring of industrial control systems controlling an industrial process, comprising:
  at least one computerized processing unit for executing processor instructions;
  an electromagnetic sensor which monitors an environment to measure a plurality of electromagnetic pulses emitted by at least one industrial control device during operation of the at least one industrial control device;
  at least one additional sensor selected from a group consisting of a light sensor and a sound sensor, said light sensor is configured to detect light emitted by said at least one industrial control device during operation of the at least one industrial control device and said sound sensor is configured to detect sound emitted by said at least one industrial control device during operation of the at least one industrial control device;
  wherein said electromagnetic sensor and said at least one additional sensor are disposed externally and distant to said at least one industrial control device, for remote sensing of said at least one industrial control device, and not connected to said at least one industrial control device;
  a learning module which calculates automatically at least one normal data pattern based on an analysis of the plurality electromagnetic pulses and a plurality of sensed signals detected by the at least one additional sensor, using the at least one computerized processing unit;
  an anomaly detection module which matches between at least one new electronic measurement values measured on one of the at least one computerized control device and new at least one of light signals and/or sound signals measured by the at least one additional sensor, and the at least one normal data pattern to detect automatically at least one abnormal data pattern, using the at least one computerized processing unit; and
  a data interface for sending a security alert in response to the abnormal data pattern;
  wherein said at least one industrial control device is a member of a group consisting of: programmable logic controllers (PLCs), supervisory control and data acquisition (SCADA) systems, individual remote terminal units (RTUs), distributed control systems (DCS), and/or combination thereof.

11. A software program product for remote monitoring of industrial control systems controlling an industrial process, comprising:
  a non-transitory computer readable storage medium;
  first program instructions for monitoring an environment of at least one industrial control device controlling an industrial process, by an electromagnetic sensor and at least one additional sensor selected from a group consisting of a light sensor and a sound sensor, said electromagnetic sensor is configured to measure a plurality of electromagnetic pulses emitted by the at least one industrial control device during operation of the at least one industrial control device, said light sensor is configured to detect light emitted by said at least one industrial control device during operation of the at least one industrial control device and said sound sensor is configured to detect sound emitted by said at least one industrial control device during operation of the at least one industrial control device,
  wherein said electromagnetic sensor and said at least one additional sensor are disposed externally and distant to said at least one industrial control device, for remote sensing of said at least one industrial control device, and not connected to said at least one industrial control device;
  second program instructions for calculating automatically at least one normal data pattern based on an analysis of the plurality of electromagnetic pulses and a plurality of sensed signals detected by the at least one additional sensor;
  third program instructions for matching between at least one new electromagnetic pulse measured by the electromagnetic sensor and new at least one of light signals and/or sound signals measured by the at least one additional sensor, and the at least one normal data pattern to automatically detect at least one abnormal data pattern; and
  fourth program instructions for sending automatically a security alert in response to the abnormal data pattern;
  wherein the first, second, third, and fourth program instructions are executed by at least one computerized processor from the non-transitory computer readable storage medium;
  wherein said at least one industrial control device is a member of a group consisting of: programmable logic controllers (PLCs), supervisory control and data acquisition (SCADA) systems, individual remote terminal units (RTUs), distributed control systems (DCS), and/or combination thereof.

* * * * *